(12) United States Patent
Dlugoss

(10) Patent No.: US 9,061,675 B2
(45) Date of Patent: Jun. 23, 2015

(54) ENERGY-BASED SHIFT CONTROL OF A BINARY CLUTCH ASSEMBLY

(71) Applicant: GM GLOBAL TECHNOLOGY OPERATIONS LLC, Detroit, MI (US)

(72) Inventor: Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/045,405

(22) Filed: Oct. 3, 2013

(65) Prior Publication Data

US 2015/0100211 A1 Apr. 9, 2015

(51) Int. Cl.
*G06F 7/00* (2006.01)
*B60W 10/02* (2006.01)
*B60W 10/11* (2012.01)

(52) U.S. Cl.
CPC .............. *B60W 10/02* (2013.01); *B60W 10/11* (2013.01)

(58) Field of Classification Search
CPC ............ B60W 10/02; B60W 2510/02; B60W 2510/0208; B60W 2510/0241; B60W 2510/0275; B60W 2510/0657; B60W 2530/10; B60W 2710/02; B60W 2710/025; B60W 2710/027; B60W 2710/0666; B60W 10/11
See application file for complete search history.

(56) References Cited

U.S. PATENT DOCUMENTS

| | | | | |
|---|---|---|---|---|
| RE41,804 E | * | 10/2010 | Rieger et al. | 477/181 |
| 2010/0292901 A1 | * | 11/2010 | Ortmann et al. | 701/67 |
| 2014/0121923 A1 | * | 5/2014 | Dlugoss | 701/67 |

* cited by examiner

*Primary Examiner* — David D Le
(74) *Attorney, Agent, or Firm* — Quinn Law Group, PLLC

(57) ABSTRACT

A vehicle includes an engine and a transmission assembly having a stationary member, gear sets, an input member connected to one of the plurality of gear sets, a binary clutch assembly, and a transmission control module (TCM). The binary clutch assembly includes a freewheeling element which holds torque only in a first rotational direction and a binary device that, when engaged, prevents rotation of the binary clutch assembly in a second rotational direction, and that allows the binary clutch assembly to freewheel in the second rotational direction when released. The TCM executes a method via instructions to determine a total amount of clutch energy of the binary clutch assembly, compare the determined total amount of clutch energy to a calibrated clutch energy threshold, and delay an execution of the requested shift when the determined total amount of clutch energy exceeds the calibrated clutch energy threshold.

19 Claims, 2 Drawing Sheets

ENERGY-BASED SHIFT CONTROL OF A BINARY CLUTCH ASSEMBLY

TECHNICAL FIELD

The disclosure relates to energy-based shift control of a binary clutch assembly.

BACKGROUND

In a motor vehicle transmission, rotatable transmission input and output members are selectively coupled using interconnected gear elements and clutches in a range of transmission output speed ratios. Some of the clutches may be fluid-actuated plate clutches having a series of spaced friction plates. A hydraulic piston may be used to compress the friction plates together and thereby transfer torque across the engaged clutch, or to stop rotation of a side of the clutch and any interconnected gear elements or nodes. Plate clutches are typically controlled with a variable rate of slip such that the state of the plate clutch can range from fully-applied to fully-released, as well as anywhere in between these two states.

In some transmissions, a binary clutch assembly is used in lieu of a plate clutch to connect some gear elements or nodes of the transmission. A typical binary clutch assembly includes a freewheeling element and an on/off binary device such as a dog clutch or a selectable one-way clutch (SOWC). Unlike conventional friction plate clutches, a binary clutch assembly has just two possible clutch states: fully-applied and fully-released. When the binary device is released, the binary clutch assembly freewheels in one rotational direction while the freewheeling element prevents rotation in the other rotational direction. Application of the binary device effectively locks the binary clutch assembly in both rotational directions.

SUMMARY

A vehicle is disclosed herein that includes a transmission assembly having a transmission control module (TCM) and a transmission. The transmission, which receives input torque from an engine or another prime mover, includes one or more gear sets, at least two gear elements or nodes of which are connected via a binary clutch assembly. The binary clutch assembly may be any torque transfer device having only the two states noted above: fully-applied and fully-released, i.e., any torque transfer mechanism characterized by an absence of a partially-applied state. The TCM is configured to delay an engagement of the binary clutch assembly during a requested shift of the transmission utilizing the binary clutch assembly whenever an energy value of the binary clutch assembly associated, e.g., a total torque acting on the binary clutch, exceeds a calibrated clutch energy threshold.

In a particular embodiment, a vehicle includes an internal combustion engine and a transmission assembly having a binary clutch assembly. The transmission assembly also includes the TCM, a stationary member, a plurality of gear sets each having a plurality of nodes, i.e., a ring gear, a sun gear, and a carrier member, and a transmission input member that is continuously connected to one of the plurality of gear sets. The binary clutch assembly has a freewheeling element which holds torque only in a first rotational direction and a binary device that, when engaged, prevents rotation of the binary clutch assembly in a second rotational direction, and that allows the binary clutch assembly to freewheel in the second rotational direction when released.

The TCM, which is in communication with the binary clutch assembly, includes a processor and memory on which is recorded instructions for controlling the binary clutch assembly. The TCM is configured to execute the instructions from the memory via the processor in response to a requested shift of the transmission to thereby determine a total amount of clutch energy value in terms of torque acting on the binary clutch assembly, compare the total amount of clutch energy to a calibrated clutch energy threshold, and delay execution of the requested shift whenever the determined total amount of clutch energy exceeds the calibrated clutch energy threshold.

The TCM may include a calibrated energy curve recorded in memory which plots clutch energy on one axis and a slip speed differential on another axis. The calibrated clutch energy threshold may be determined by the TCM via reference to the calibrated energy curve.

One or more sensors, e.g., weight sensors or scales, may be optionally positioned with respect to the vehicle and configured to help determine a mass of cargo and occupants of the vehicle. The TCM in this embodiment may be further configured to determine the total amount of clutch energy as a function of the mass of the vehicle, the masses of the cargo and occupants, an acceleration of the vehicle, a torque of the engine, and an inertial torque of the vehicle.

A transmission assembly is also disclosed herein for use with a vehicle having an internal combustion engine. The transmission assembly includes the stationary member, the plurality of gear sets, the transmission input member, the binary clutch assembly, and the TCM which is configured as noted above.

A method of controlling the binary clutch assembly includes determining, via the TCM, a total amount of clutch energy of the binary clutch assembly, and then comparing the determined total amount of clutch energy to a calibrated clutch energy threshold. The method also includes delaying an execution of the requested shift when the determined total amount of clutch energy exceeds the calibrated clutch energy threshold.

The above features and the advantages of the present disclosure are readily apparent from the following detailed description of the best modes for carrying out the invention when taken in connection with the accompanying drawings.

DETAILED DESCRIPTION

Figure 1:
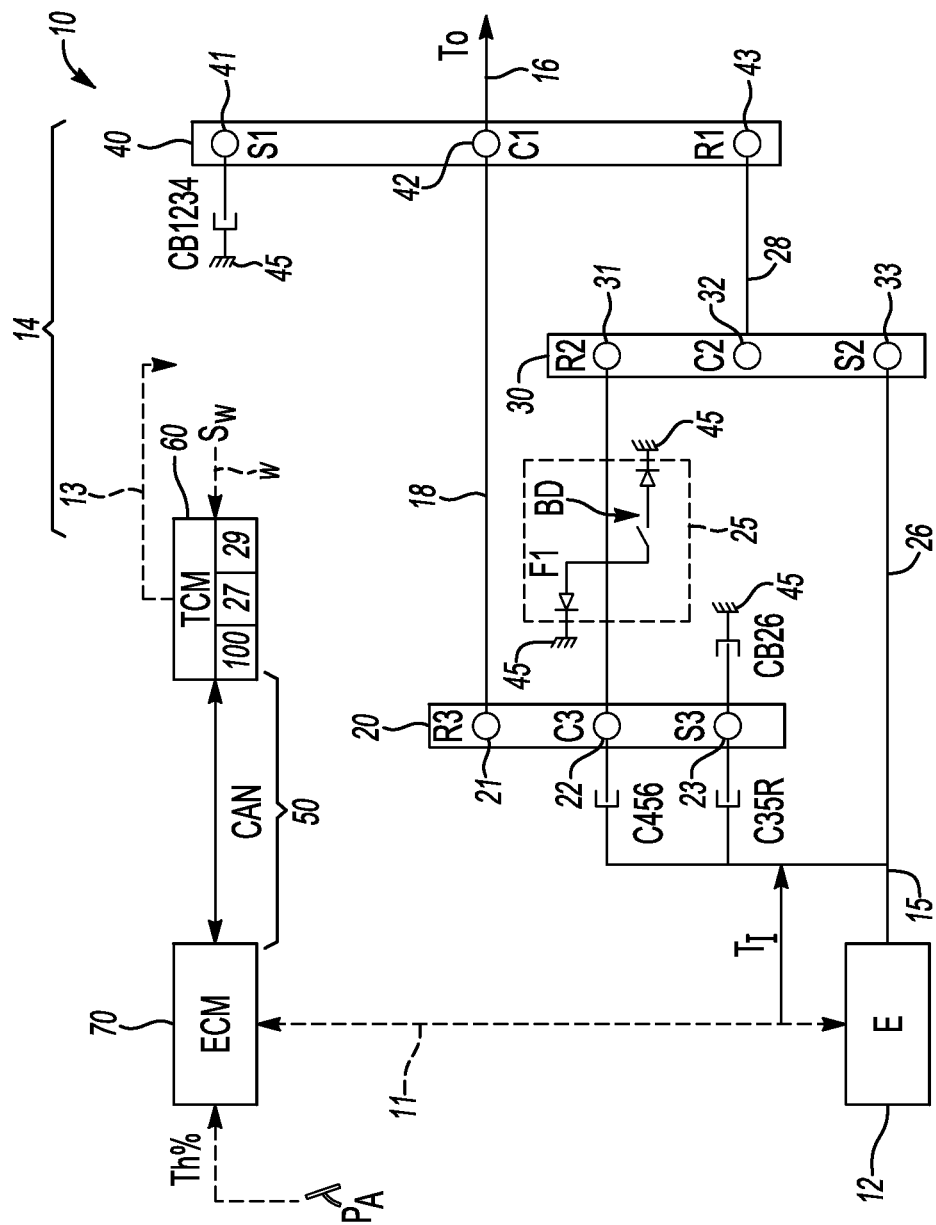
FIG. 1 is a schematic illustration of an example vehicle having an automatic transmission with a binary clutch assembly, and a controller that enables execution of a requested shift of the binary clutch assembly only when a total amount of clutch energy or torque associated with the requested shift is less than a calibrated clutch energy threshold.

Referring to the drawings, an example vehicle 10 is shown schematically in FIG. 1. The vehicle 10 includes an internal combustion engine 12 or other prime mover, and an automatic transmission 14 having a binary clutch assembly 25. The transmission 14 is shown schematically in lever diagram form. The vehicle 10 also includes a control system 50, which may be embodied as a transmission control module (TCM) 60 and an engine control module (ECM) 70. The control system 50 is programmed in software and equipped in hardware to determine a total amount of clutch energy, e.g., a total torque, of the binary clutch assembly 25 during a requested shift of the transmission 14. The control system 50 selectively delays or inhibits execution of the requested shift when the total amount of clutch energy is high relative to a calibrated clutch energy threshold, e.g., a torque acting on the clutch. Details of a method 100 for accomplishing this energy-based shift control approach is described below with reference to FIGS. 2-4.

Execution of the method 100 by the control system 50 is intended to minimize forces imparted to the binary clutch assembly 25 during any shift of the transmission 14 requiring engagement of the binary clutch assembly 25. Shifts involving the binary clutch assembly 25 vary with the transmission design, but typically include a coasting shift to reverse, e.g., a rolling garage shift or a rock cycle in which rapid shifting between drive and reverse is needed to free the vehicle 10 from ice or snow. Use of the method 100 may provide greater flexibility as to when the binary clutch assembly 25 can be applied, as engagement of the binary clutch assembly 25 at non-zero slip speed differentials may be possible at certain times using the present method 100.

The method 100 disclosed herein may be used with the example transmission 14 of FIG. 1 as well as with other transmission designs using a binary clutch assembly similar to that shown at 25 in FIG. 1. Regardless of how the transmission 14 is configured, at least two gear elements or nodes of the transmission 14 are connected to the binary clutch assembly 25. The TCM 60 and ECM 70 of FIG. 1 may be embodied as digital computer devices, and may communicate with each other over a controller area network (CAN) bus or other suitable network. Structurally, the TCM 60 may include a processor 27 along with sufficient tangible, non-transitory memory 29, e.g., read-only memory (ROM), flash memory, optical memory, additional magnetic memory, etc. The TCM 60 may also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry.

Instructions for executing the method 100 may be recorded in the memory 29 and executed as needed via the processor(s) 27, with the TCM 60 ultimately outputting binary clutch control signals (arrow 13) to the transmission 14. Although omitted for simplicity from FIG. 1, the ECM 70 may include similar hardware components as the TCM 60. The ECM 70 may also receive a throttle request (Th %) from an accelerator pedal ($P_A$) as shown, and thus the ECM 70 remains in control of typical engine functions via a set of engine control signals (arrow 11), as is well understood in the art.

The example transmission 14 of FIG. 1 may include an input member 15 carrying input torque (arrow $T_I$) from the engine 12 into the transmission 14, and an output member 16 carrying output torque ($T_O$) from the transmission 14 to the drive wheels (not shown). The respective input and output members 15 and 16 are selectively connected to each other at a desired speed ratio via one or more gear sets.

In the embodiment of FIG. 1, the transmission 14 is shown as an example 6-speed automatic transmission having three planetary gear sets, i.e., a first gear set 20, a second gear set 30, and a third gear set 40. However, as noted above other configurations may be used without departing from the intended inventive scope. The first gear set 20 may include first, second, and third nodes 21, 22, and 23, respectively. The nodes 21, 22, and 23 may be optionally embodied as a ring gear (R3), a carrier member (C3), and sun gear (S3). The second and third gear sets 30 and 40 may likewise have respective first, second, and third nodes. For the second gear set 30, the first, second, and third nodes are nodes 31, 32, and 33, respectively, which may be a ring gear (R2), a carrier member (C2), and a sun gear (S2) in one embodiment. The third gear set 40 includes respective first, second, and third nodes 41, 42, and 43, e.g., a sun gear (S1), a carrier member (C1), and a ring gear (R1).

With respect to the first gear set 20, the first node 21 is continuously connected to the second node 42 of the third gear set 40 via an interconnecting member 18. The second node 22 is selectively connected to the engine 12 and the input member 15 via a first rotating clutch C456. Likewise, the third node 23 is selectively connected to the engine 12 and the input member 15 via a second rotating clutch C35R. The third node 23 is selectively connected to a stationary member 45 of the transmission via a first braking clutch CB26. As used herein for all clutches, the letter "C" refers to "clutch", "B" refers to "brake", and the various numbers refer to the particular forward drive gear modes, e.g., "R" is reverse, "1" is $1^{st}$ gear, "2" represents $2^{nd}$ gear, etc., all the way up to $6^{th}$ gear. The absence of a "B" in the clutch designation indicates that the particular clutch is a rotating clutch.

In the second gear set 30 of FIG. 1, the first node 31 is selectively connected to the second node 22 of the first gear set 20 via the binary clutch assembly 25. The binary clutch assembly 25 includes a freewheeling element F1 and an on/off binary device (BD), both of which selectively connect to a stationary member 45 of the transmission 14. Engagement of the binary device (BD) of the binary clutch assembly 25 locks nodes 22 and 31 to the stationary member 45. The second node 32 is continuously connected to the third node 43 of the third gear set 40 via another interconnecting member 28. The third node 33 is continuously connected to the input member 15 via another interconnecting member 26. The first node 41 of the third gear set 40 is selectively connected to the stationary member 45 via a second braking clutch CB1234.

As noted above, the vehicle 10 of FIG. 1 may use the binary clutch assembly 25 when shifting to a reverse gear state, such as during a rolling garage shift as that term is known in the art, as well as when shifting from $1^{st}$ gear to $2^{nd}$ gear. The binary clutch assembly 25 is typically in an off/released state and thus freewheeling in one rotational direction in all gear states above $2^{nd}$ gear in order to reduce slip losses in these higher gears. As noted above, the binary clutch assembly 25 has two parts as shown in FIG. 1: the passive one-way clutch or freewheeling element F1, which allows rotation of the node connected to it, such as node 31 of the second gear set 30, in only rotational direction, and the binary device (BD). The binary device (BD), which may be embodied as a selectable one-way clutch (SOWC) or a dog clutch, is selectively applied to prevent rotation of the binary clutch assembly 25 in both rotational directions. Hence, by applying the binary device (BD), any nodes connected to the binary device (BD) are effectively grounded to the stationary member 45.

Figure 2:
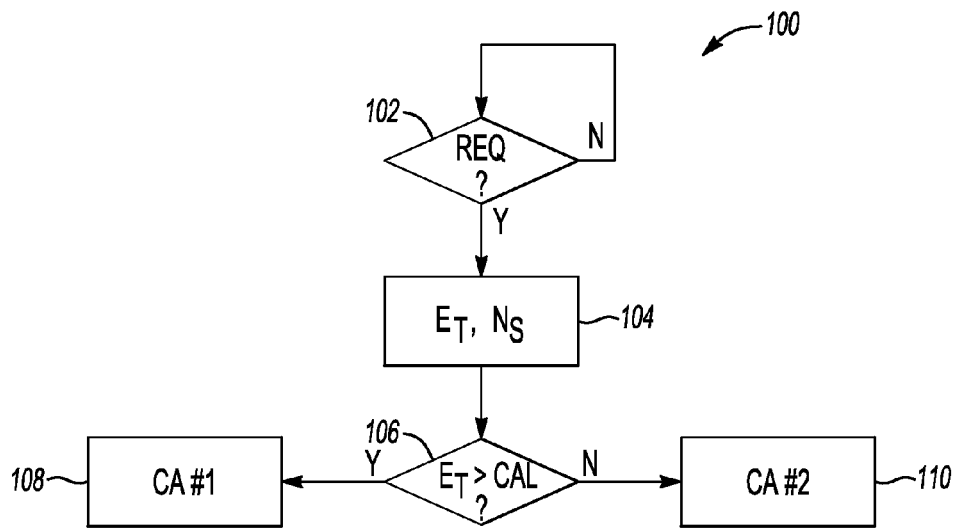
FIG. 2 is a flow chart describing an example energy-based method for controlling a shift of the binary clutch assembly shown in FIG. 1.

Referring to FIG. 2, the method 100 begins at step 102, wherein the control system 50 of FIG. 1 determines whether a request (REQ) is active for a designated shift of the transmission 14, which is any shift requiring an engagement of the binary clutch assembly 25. Step 102 may entail processing vehicle parameters such as the throttle request (arrow Th %), a PRNDL setting of the transmission 14, pedal positions, e.g., of the accelerator pedal $P_A$ or a brake pedal (not shown), vehicle speed, engine speed, transmission input and/or output speed, etc. Step 102 is repeated until a shift request requiring an engagement of the binary clutch assembly 25 is detected, at which point the method 100 proceeds to step 104.

Step 104 entails determining a total amount of clutch energy (E) of the binary clutch assembly 25 during the shift requested at step 102. As used herein, the term "energy" may be used synonymously with forces such as torque acting on the binary clutch assembly 25 through the various interconnected elements of the powertrain, for instance the input member 15, the gear sets 20, 30, and 40, and the interconnecting members 18 and 26 of FIG. 1. Various factors may be processed by the control system 50 in determining the total amount of clutch energy (E) at any moment, using knowledge of the power flow and lever ratios of the transmission 14.

Figure 3:
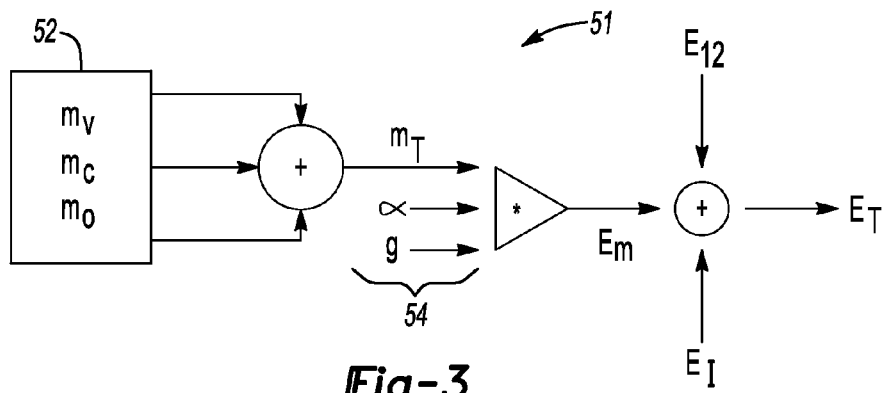
FIG. 3 is logic flow diagram usable for calculating a total amount of clutch energy level for the binary clutch assembly within the method shown in FIG. 2.

One possible combination of factors is shown in FIG. 3, which is a logic diagram 51 depicting a vehicle mass calculation block 52. Block 52 accounts for the mass of the vehicle 10, as well as the collective mass of any cargo contained in the vehicle 10 and that of any occupants. These masses are represented as $m_V$, $m_C$, and $m_O$, respectively. The empty mass of the vehicle 10 can be calibrated, while that of the cargo and occupants can be calculated from measured weights, e.g., via a seat or floor-positioned weight sensor or scale $S_W$ and measured weight signal (arrow W) as shown in FIG. 1, modified as needed by altitude, for instance from a global positioning system (GPS) unit (not shown).

The masses $m_V$, $m_C$, and $m_O$ are then added together to derive the total vehicle mass ($m_T$), which is one possible value of a set of input values 54. Other input values 54 may include acceleration ($\alpha$) of the vehicle 10, which may be calculated as a function of the vehicle's actual acceleration and gravitational acceleration (g), a change in slip speed across the binary clutch assembly 25, and/or road grade. The multiplied values m, $\alpha$, and g provide a total energy in terms of force or torque from the mass of the vehicle 10, i.e., $E_m$.

A total amount of energy ($E_T$) in the form of a total torque acting on the binary clutch assembly 25 of FIG. 1 during the requested shift may be determined by adding the energy from the mass of the vehicle, i.e., $E_m$, to all other known or calculated energy in the form of torques acting on the binary clutch assembly 25, e.g., energy from the engine 12 ($E_{12}$) and any inertial torque-related energy ($E_I$) describing the inertia of a torque converter turbine, flywheel, and other rotating components of the transmission 14 and the rest of the connected powertrain acting on the input member 15. Formulaically, this may be represented as:

$$E_T = T_T = E_m K_1 + E_{12} K_2 + E_I K_3$$

where $K_1$, $K_2$, and $K_3$ are constants describing a particular gear ratio or a ratio based on the node at which the torque is calculated and the node effected by the torque, such as the binary clutch input or output node, at the time of the requested shift, and $T_T$ is the total torque, showing that all energies may be described interchangeably as torque in Nm for the purposes of the method 100.

The actual energies/torques considered in a given application may vary, as all energy levels are particular to the specific lever diagram of the transmission 14 and associated powertrain components. That is, the forces acting on each lever, such as on the gear sets 20, 30, and 40 of FIG. 1, are captured with respect to the resultant force across the binary clutch assembly 25. Some of this information may be modeled off line and stored in memory 29 for use during execution of the method 100. For determining the slip differential ($N_S$) across the binary clutch assembly 25, the vehicle 10 of FIG. 1 may use existing conventional sensors to determine internal speeds of the input and output members, as is known in the art.

The method 100 shown in FIG. 2 proceeds to step 106 once the total torque ($T_T$) or total amount of clutch energy ($E_T$) is determined.

Step 106 of FIG. 2 entails comparing the total amount of clutch energy ($E_T$) from step 104 to a calibrated clutch energy threshold. The calibrated clutch energy threshold may be stored as a trace or lookup table in memory 29 of FIG. 1 and used by the control system 50 to execute step 106. An example embodiment is shown in FIG. 4 in the form of an example energy curve 55, which as known in the art can be replicated as a lookup table of corresponding values.

Figure 4:
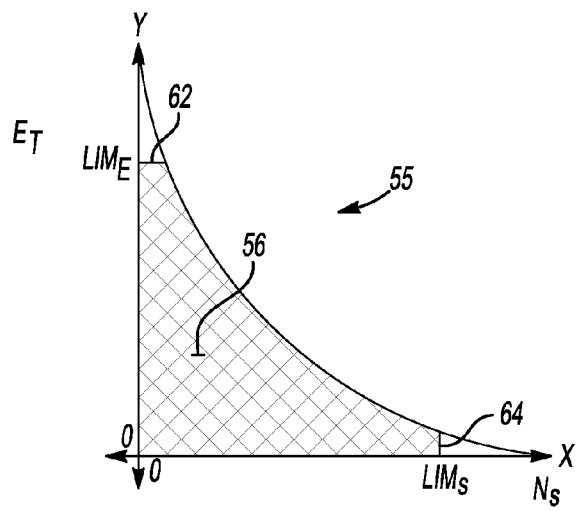
FIG. 4 is an example energy profile for a binary clutch assembly usable as part of the method shown in FIG. 2.

Referring to FIG. 4, the total amount of clutch energy ($E_T$), e.g., the total torque ($T_T$) from FIG. 2 in Nm, is plotted on the y-axis, while slip speed differential ($N_S$) across the binary clutch assembly 25 in RPM is plotted on the x-axis. A binary clutch engagement zone 56 exists in the energy curve 55 between calibrated limits 62 and 64. Limit 62 represents the energy limit ($LIM_E$) at a slip speed differential of zero. Limit 64 represents the slip differential limit ($LIM_S$) for the binary clutch assembly 25. For example, a maximum permissible slip speed differential of 300 RPM is one possible embodiment. If slip across the binary clutch assembly 25 exceeds this 300 RPM differential in this example, the binary clutch assembly 25 of FIG. 1 is not applied, as energy trace 55 shows a permissible total amount of energy ($E_T$) of zero or nearly zero at a slip differential above the level of limit 64.

Likewise, a permissible total amount of clutch energy ($E_T$) at a slip differential of zero for a given binary clutch assembly 25 may be considerably high. For instance, the limit 62 may be 3000 Nm in the same example embodiment. If so, even if slip across the binary clutch assembly 25 of FIG. 1 is less than its maximum allowed slip differential, or limit 64 which in the same example is 300 RPM, the control system 50 of FIG. 1 may still decide to delay the engagement of the binary clutch assembly 25 whenever the total amount of clutch energy ($E_T$) remains above the level of limit 62.

In other words, engagement of the binary clutch assembly 25 of FIG. 1 is enabled by the control system 50 of FIG. 1 only when operating in zone 56 of FIG. 4. The corresponding values for limits 62 and 64 of zone 56 will vary with the design, as some binary clutch assemblies may be more durable than others for a given powertrain, and thus able to tolerate higher slip differentials and higher clutch energies. However, an energy curve 55 as shown in FIG. 4 or an equivalent data table maybe used by the TCM 60 to govern the decision as to when the binary clutch assembly 25 of FIG. 1 can be applied.

Referring again to FIG. 2, the method 100 proceeds to step 108 when the total amount of clutch energy ($E_T$) determined at step 104 is outside of zone 56, and proceeds in the alternative to step 110 when the total amount of clutch energy ($E_T$) is within zone 56.

At step 108 of FIG. 2, the control system 50 of FIG. 1 executes a first control action (CA #1) in response to the determination at step 106 that the total amount of clutch energy ($E_T$) from step 104 lies outside of zone 56 of FIG. 4. The first control action may entail temporarily delaying, via the binary clutch control signals (arrow 13) from the TCM 60 of FIG. 1, an engagement of the binary clutch assembly 25 until the total amount of clutch energy ($E_T$) again falls within zone 56 of FIG. 4. While a short delay may be a perceptible response lag to a driver, use of the delay has the benefit of reducing forces transmitted to the binary clutch assembly 25 during the shift. As such, the enforced delay of the shift onset may be considered an acceptable performance tradeoff.

At step 110, having determined at step 106 that the total amount of clutch energy ($E_T$) from step 104 falls within zone 56 of FIG. 4, the control system 50 of FIG. 1 executes a second control action (CA #2). The second control action may include immediately executing the shift that was previously requested at step 102, for example by engaging the binary clutch assembly 25 and entering reverse while coasting.

Using the method 100 described above, the control system 50 of FIG. 1 can ensure that the binary clutch assembly 25 is applied only with sufficiently low clutch energy. Use of clutch energy as an enabling factor in deciding when to apply the binary clutch assembly 25 in the manner disclosed herein recognizes that non-zero slip differential conditions may occur which correspond to clutch energy levels falling within durability limits. Therefore, the actual values corresponding to the limits 62 and 64 shown in FIG. 4 will vary depending on the design of the binary clutch assembly 25, as more durable binary clutch designs may tolerate higher slip speed differentials at a lower clutch energy, and conversely, may experience lower clutch energy at higher slip speed differentials. Thus, use of the energy curve 55 shown in FIG. 4 or similar energy-based decision criteria during engagement of the binary clutch assembly 25 of FIG. 1, a more accurate determination may be made of a suitable engagement range, which may in turn improve powertrain control flexibility.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine; and
a transmission assembly having:
a stationary member;
a plurality of gear sets each having a plurality of nodes, wherein the nodes for each of the plurality of gear sets include a ring gear, a sun gear, and a carrier member;
a transmission input member that is continuously connected to the engine and to one of the plurality of gear sets;
a binary clutch assembly having a freewheeling element which holds torque only in a first rotational direction and a binary device, wherein the binary device, when engaged, prevents rotation of the binary clutch assembly in a second rotational direction, and when released allows the binary clutch assembly to freewheel in the second rotational direction; and
a transmission control module (TCM) in communication with the binary clutch assembly, wherein the TCM includes a processor and memory on which is recorded instructions for controlling the binary clutch assembly, and wherein the controller is configured to execute the instructions from the memory via the processor in response to a requested shift of the transmission to thereby:
determine a total amount of clutch energy of the binary clutch assembly during the requested shift;
compare the determined total amount of clutch energy to a calibrated clutch energy threshold; and
delay an execution of the requested shift when the determined total amount of clutch energy exceeds the calibrated clutch energy threshold.

2. The vehicle of claim 1, wherein the binary clutch assembly is a selectable one way clutch.

3. The vehicle of claim 1, wherein the TCM is further configured to detect a requested shift of the transmission into reverse or neutral from first gear as the requested shift, and to command engagement of the binary clutch assembly in response to the requested shift only when the determined total amount of clutch energy is less than the calibrated clutch energy threshold.

4. The vehicle of claim 1, wherein the plurality of gear sets includes a first and a second gear set, and wherein the binary clutch assembly is connected between respective nodes of the first and second gear sets.

5. The vehicle of claim 4, wherein the respective nodes include the carrier member of the first gear set and the ring gear of the second gear set.

6. The vehicle of claim 1, wherein the TCM includes a calibrated energy curve recorded in the memory which plots clutch energy on one axis and slip speed differential on another axis, and wherein the calibrated clutch energy threshold is determined by the TCM via reference to the calibrated energy curve.

7. The vehicle of claim 1, further comprising a sensor positioned with respect to the vehicle and configured to determine a mass of cargo and occupants of the vehicle, wherein the TCM is further configured to determine the total amount of clutch energy of the binary clutch assembly as a function of the mass of the vehicle, the masses of the cargo and occupants, an acceleration of the vehicle, a torque of the engine, and an inertial torque of the vehicle.

8. A transmission assembly for use with a vehicle having an internal combustion engine, the transmission assembly comprising:
a stationary member;
a plurality of gear sets each having a plurality of nodes, wherein the nodes for each of the plurality of gear sets are one of a ring gear, a sun gear, and a carrier member;
a transmission input member that is continuously connected to the engine and to one of the plurality of gear sets;
a binary clutch assembly having a freewheeling element which holds torque only in a first rotational direction and a binary device, wherein the binary device, when engaged, prevents rotation of the binary clutch assembly in a second rotational direction, and when released allows the binary clutch assembly to freewheel in the second rotational direction when released; and
a transmission control module (TCM) in communication with the binary clutch assembly, wherein the TCM includes a processor and memory on which is recorded instructions for controlling the binary clutch assembly, and wherein the controller is configured to execute the instructions from the memory via the processor in response to a requested shift of the transmission to thereby:
determine a total amount of clutch energy of the binary clutch assembly;
compare the determined total amount of clutch energy to a calibrated clutch energy threshold; and
delay an execution of the requested shift when the determined total amount of clutch energy exceeds the calibrated clutch energy threshold.

9. The transmission assembly of claim 8, wherein the binary clutch assembly is a selectable one way clutch.

10. The transmission assembly of claim 8, wherein the TCM is further configured to detect a requested shift of the transmission into reverse or neutral from first gear as the request shift, and to command engagement of the binary device in response to the requested shift only when the determined total amount of clutch energy is less than the calibrated clutch energy threshold.

11. The transmission assembly of claim 8, wherein the plurality of gear sets includes a first and a second gear set, and wherein the binary clutch assembly is connected between respective nodes of the first and second gear sets.

12. The transmission assembly of claim 11, wherein the respective nodes include the carrier member of the first gear set and the ring gear of the second gear set.

13. The transmission assembly of claim 8, wherein the TCM includes a calibrated energy curve in the memory which plots clutch energy on one axis and slip speed differential on another axis, and wherein the calibrated clutch energy threshold is determined by the TCM via reference to the calibrated energy curve.

14. The transmission assembly of claim 8, wherein the vehicle includes a sensor positioned with respect to the vehicle and configured to determine a mass of cargo and occupants of the vehicle, and wherein the TCM is further configured to determine the total amount of clutch energy of the binary clutch assembly as a function of the mass of the vehicle, the masses of the cargo and occupants, an acceleration of the vehicle, a torque of the engine, and an inertial torque of the vehicle.

15. A method of controlling a binary clutch assembly in a vehicle having an internal combustion engine and a transmission assembly, wherein the transmission assembly includes a plurality of gear sets each having a plurality of nodes and a transmission input member that is continuously connected to the engine and to one of the plurality of gear sets, the method comprising:

determining, via a transmission control module (TCM) of the vehicle, a total amount of clutch energy of the binary clutch assembly in response to a requested shift of the transmission involving the binary clutch assembly;

comparing the determined total amount of clutch energy to a calibrated clutch energy threshold; and delaying an execution of the requested shift when the determined total amount of clutch energy exceeds the calibrated clutch energy threshold.

16. The method of claim 15, wherein the TCM includes a calibrated energy curve in the memory which plots clutch energy on one axis and slip speed differential on another axis, and wherein comparing the determined total amount of clutch energy to a calibrated clutch energy threshold includes referencing the calibrated energy curve.

17. The method of claim 15, wherein the vehicle includes a sensor positioned with respect to the vehicle and configured to determine a mass of cargo and occupants of the vehicle, and wherein determining the total amount of clutch energy of the binary clutch assembly includes determining the masses of the cargo and occupants via the sensor, and calculating the total amount of clutch energy as a function of a mass of the vehicle, the masses of the cargo and occupants, an acceleration of the vehicle, a torque of the engine, and an inertial torque of the vehicle.

18. The vehicle of claim 1, wherein the binary device is a dog clutch.

19. The transmission assembly of claim 8, wherein the binary device is a dog clutch.

* * * * *